(12) United States Patent
Pissarenko et al.

(10) Patent No.: US 8,959,991 B2
(45) Date of Patent: Feb. 24, 2015

(54) METHOD FOR ESTIMATING PROPERTIES OF A SUBTERRANEAN FORMATION

(75) Inventors: Dimitri Vladilenovich Pissarenko, Chatenay-Malabry (FR); Kreso Kurt Butula, Zagreb (HR); Sergey Sergeevich Safonov, Moscow (RU); Denis Vladimirovich Rudenko, Obninsk (RU); Oleg Yurievich Dinariev, Moscow (RU); Oleg Mikhailovich Zozulya, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 76 days.

(21) Appl. No.: 13/996,501

(22) PCT Filed: Dec. 21, 2010

(86) PCT No.: PCT/RU2010/000769
§ 371 (c)(1),
(2), (4) Date: Sep. 19, 2013

(87) PCT Pub. No.: WO2012/087175
PCT Pub. Date: Jun. 28, 2012

(65) Prior Publication Data
US 2014/0000357 A1    Jan. 2, 2014

(51) Int. Cl.
| | |
|---|---|
| *E21B 47/08* | (2012.01) |
| *E21B 47/00* | (2012.01) |
| *G01V 11/00* | (2006.01) |
| *E21B 49/00* | (2006.01) |
| *E21B 47/10* | (2012.01) |

(52) U.S. Cl.
CPC ............ *G01V 11/002* (2013.01); *E21B 49/008* (2013.01); *E21B 47/1015* (2013.01)
USPC .................. 73/152.39; 73/152.55; 166/252.6

(58) Field of Classification Search
None
See application file for complete search history.

(56) References Cited

U.S. PATENT DOCUMENTS

| | | | |
|---|---|---|---|
| 3,991,827 A | 11/1976 | Schall | |
| 5,168,927 A * | 12/1992 | Stegemeier et al. | 166/252.6 |
| 5,501,273 A * | 3/1996 | Puri | 166/252.5 |
| 6,764,871 B2 | 7/2004 | Kawaguchi et al. | |
| 7,059,591 B2 | 6/2006 | Bortkevitch et al. | |
| 7,272,973 B2 * | 9/2007 | Craig | 73/200 |
| 7,389,185 B2 * | 6/2008 | Craig | 702/13 |
| 7,472,748 B2 | 1/2009 | Gdanski et al. | |
| 2009/0107673 A1 | 4/2009 | Huang et al. | |
| 2009/0288820 A1 | 11/2009 | Barron et al. | |
| 2012/0118564 A1 * | 5/2012 | Gomes et al. | 166/250.12 |
| 2013/0017610 A1 * | 1/2013 | Roberts et al. | 436/27 |
| 2013/0091942 A1 * | 4/2013 | Samson et al. | 73/152.18 |
| 2013/0341012 A1 * | 12/2013 | Belani et al. | 166/250.12 |

FOREIGN PATENT DOCUMENTS

| | | |
|---|---|---|
| EP | 1355038 A1 | 10/2003 |
| EP | 2020260 A1 | 2/2009 |
| JP | 2001276589 A | 10/2001 |
| JP | 2002166151 A | 6/2002 |
| JP | 2003117368 A | 4/2003 |
| JP | 3682286 B2 | 8/2005 |
| RU | 2354826 C2 | 5/2009 |
| WO | 2009079092 A2 | 6/2009 |

OTHER PUBLICATIONS

Dinariev et al., "Modeling of isothermal processes in porous materials on the basis of the concept of an ensemble of pores", Izvestia RAN Mechanics of Liquid and Gas, No. 5, 2007, 14 pages.

* cited by examiner

*Primary Examiner* — Andre Allen

(57) ABSTRACT

A method for estimating properties of a subterranean formation penetrated by a wellbore provides for injecting a fluid with the plurality of tracer agents wherein each tracer agent is an object of submicron scale, into the wellbore and formation, flowing the fluid back from the subterranean formation and determining the properties of the formation. The properties are determined by analyzing changes in the tracers size and type distribution function between the injection fluid and produced fluid.

18 Claims, No Drawings

METHOD FOR ESTIMATING PROPERTIES OF A SUBTERRANEAN FORMATION

CROSS-REFERENCE TO RELATED APPLICATION

This application is a United States National Stage Application under 35 U.S.C. §371 and claims priority to Patent Cooperation Treaty Application Number PCT/RU2010/000769 filed Dec. 21, 2010, which is incorporated herein by reference in its entirety.

FIELD OF THE INVENTION

This invention relates generally to the field oil and gas subsurface earth formation evaluation techniques; particularly to methods of estimating properties of a subterranean formation.

BACKGROUND ART

Various methods have been developed to estimate properties of a subterranean formation.

Traditional downhole measurement methods can provide detailed information about formation porosity, fluid saturation distribution through wireline logging such as electric, gamma, neutron logging, nevertheless these methods has limitations on the depth of the investigation of 5-10 cm. Formation testing/sampling tools have deeper radius of the investigation but can provide only averaged information on the formation effective permeability, sample of the reservoir fluid that is representative for the near wellbore zone in general. Sonic/acoustic tools can detect only strong variation in the fluid saturation.

U.S. Pat. No. 7,472,748 describes a method for estimating a property of a subterranean formation wherein a fracturing fluid comprising one or more tracers is introduced into a subterranean formation. A plurality of flowback fluid samples is recovered from the formation and fluid identity data for the fracturing fluid and for one or more of the flowback fluid samples are determined. Then one or more approximate properties of the subterranean formation based on the fluid identity data, one or more subterranean formation properties and at least one reservoir model are determined.

Though known methods are quite useful there is a need for an environmentally friendly high resolution method for estimating properties of a subterranean formation.

SUMMARY OF THE INVENTION

It is therefore an object of the invention to provide a method for estimating properties of a subterranean formation penetrated by a wellbore comprising the steps of providing an injection fluid comprising a plurality of tracer agents, wherein each tracer agent is an object of submicron scale, injecting the fluid with the plurality of tracer agents into the wellbore and formation, flowing the fluid back from the subterranean formation and determining the properties of the formation by analyzing changes in the tracers size and type distribution function between the injection fluid and produced fluid. Analyzing changes in the tracers size and type distribution function can be performed by comparing samples of the injected and produced fluids or it can be performed while flowing in the formation by the acoustics, electric, thermal, neutron or gamma-ray logging.

The properties of the subterranean formation include pore size distribution, effective pore ensembles permeability, distribution of the fluid saturation, distribution of the fluid/rock chemical properties, rock wettability distribution over the pore ensembles, temperature of the formation According to one embodiment, the plurality of nano-tracer agents are low or insoluble gas bubbles having a diameter not more than 500 nm, the injection fluid is water- or hydrocarbon-based solution and the injection fluid with the plurality of tracer agents is a highly dispersed gas-liquid mixture. Suitable gases for use as the tracer agents are methane, higher molecular weight hydrocarbon gas, nitrogen or other insoluble inorganic gas or mixtures of thereof.

The nano-bubble is normally created by dispersion of above mentioned gas or gases in water- or hydrocarbon-based solutions. Water solutions can be made with different conventional oilfield salts (NaCl, KCl, $CaCl_2$, $ZnBr_2$, $CaBr_2$, and other inorganic or organic brines and their mixtures) that are used as completions solutions (brines and heavy brines) and other oilfield fluids. Nano-bubbles can be particularly strongly stabilized with electrolytes of ferrous ions, manganese ions, calcium ions, or any other mineral ion is added to the aqueous solution such that the electrical conductivity in the aqueous solution becomes not less than 300 µS/cm. The nano-bubble is a very tiny bubble having a diameter of not more than 500 nm, so that the nano-bubble does not experience buoyant forces and rupture near the fluid surface, which is observed in normal and micro-bubbles.

According to another embodiment, the plurality of nano-tracer agents are high viscous liquid droplets having a diameter of not more than 1000 nm and the injection fluid with the plurality of tracer agents is an emulsion such as crude oil in water, toluene in water etc. where water is fresh water, solutions of different salts (inorganic as NaCl, KCl, $NH_4Cl$, $CaCl_2$, $MgCl_2$, $NaBr_2$, $ZnBr_2$, $CaBr_2$, or of organic nature such as sodium formate, potassium formate and other brines and their mixtures commonly used in stimulation, gravel pack and completion operations including) in water (saturated or under-saturated), brines and water with other chemicals such as surfactants, biocides, clay control, iron control, scale control etc. used as additives. It is not unusual that the emulsions are stabilized with the use of nano-solid particles, such as silica, for example. Size of the silica nano-particles ranges between 2-500 nm, The loading of the solid nano-particles for the purpose of the stabilization has seen concentrations from 0.1 wt % to 15 wt % depending on the salinity and the temperature of the system, where the increase in salinity normally requires an increase in solids concentration for the stability of the emulsion to be increased.

According to yet another embodiment, the plurality of nano-tracer agents are solid particles. These particles can be silica, synthesized copper, magnetite ($Fe_3O_4$), ferri/ferrous chlorides, barium iron oxide ($BaFe_{12}O_{19}$), zinc oxide, aluminium oxide, magnesium oxide, zirconium oxide, titanium oxide, cobalt (II) and nickel (II) oxide, barium sulfate ($BaSO_4$), etc. and the injection fluid with the plurality of tracer agents is stabilized solution in aqueous fluids, solvent based fluids such as alcohols, [ethylene glycol], or hydrocarbon based fluids. The particles can be also of organic origin such as co-polymer suspensions such as latex, polysteren beads x-linked with di-vinyl benzene and others. Pyrolectric and piezoelectric crystals may also be used in the compositions herein.

The injection fluid comprising a plurality of nano-tracer agents is provided by mixing the injection fluid with the plurality of tracer agents by means of a generator placed in the wellbore or by surface located equipment.

The injection of the injection fluid can be accompanied by a physical treatment (vibration, or heating, or acoustic treatments) performed before, during or after the injection process.

In another embodiment, the method can include adding to the injection fluid comprising a plurality of tracers one or more additives selected from a group comprising gelling agents, foaming agents, friction reducers, surfactants.

Another aspects and advantages of the invention will be apparent from the following description and the appended claims.

DETAILED DESCRIPTION OF THE INVENTION

Independently of the origination (gas bubbles, solid particles, liquid droplets or anything else) tracer agents having a submicron scale poses property of staying in bulk of the transport fluid without gravity segregation and not changing size distribution function of the tracers within time exceeding the duration of the formation testing operation. Due to the stability of the tracers properties in bulk all changes in tracer agents size distribution function in the produced fluid should be attributed to the interaction between the tracer agents and the porous media of the formation. Changes in the tracer agents size and type distribution function can be attributed to:
  Entrapment of the tracers in the pores with comparable size, difference in effective permeability of the pores at different scales.
  Chemical interaction between the tracer agents and components of the reservoir fluid/phases of the fluid, chemical interaction with the rock material if chemically active tracers are used.
  Different interaction with the rock surface due to inhomogeneous distribution of the rock wettability over the pore ensembles.
  Sensitivity of the tracer agents to the temperature.
  Here the injection fluid comprising a plurality of tracers is a mixture of:
  Gas and liquid, whereas the gas is a low or no soluble gas bubbles in the liquid and liquid can be any mixture of water, brine, acids, hydrocarbons with any combination of additives such but not limited to as gelling agents, foaming agents, friction reducers etc. Gas used can be hydrocarbon gas such as methane or higher molecular weight hydrocarbon gas, nitrogen or other inorganic gas or mixtures of thereof. The liquid phase is the prime phase and the gas the secondary phase dispersed in the mixture with known size distribution, and life span and determines the physical and chemical properties of the mixture;
  Liquid-Liquid, so-called an emulsion which can be a presence of the high viscous liquid inside the low viscous liquid, as well as the presence of smaller droplets inside the larger one called double, triple etc. emulsion;
    Liquid-solids, where the presence of the solid object inside the main liquid phase can be produced by the introducing the solid particles, crystallization, chemical reaction, biological processes etc.

The creation of the injection fluid with the plurality of tracer agents is carried out by either down-hole nano-tracers mixture generator placed in the wellbore or by surface located equipment which can be in form of generators or various types of tanks or canisters supplying the volume required for injection of the mixture. The example of such surface generator of nano bubbles is well explained in U.S. Pat. No. 7,059,591. Various fine size bubble generators are described in Japanese Patent Application Publication No. 2001-276589. 2002-11335, 2002-166151, and No. 2003-117368, Japanese Patent No. 3682286, EP application 2020260 and similar can be envisioned.

The generation of solid nano particles is explained in several instances and also in U.S. patent application No. 2009/0107673 and PCT patent No. WO2009/079092.

The injection into the formation may be complemented with physical treatment such as vibration, heating, acoustic treatments performed before, during or after the injection process is performed.

Thereafter measurements are then performed to determine the properties of the formation by analyzing the tracer agents size and type distribution function between the injection fluid and produced fluid. Analyzing changes in the tracer agents size and type distribution function can be performed by comparing samples of the injected and produced fluids or it can be performed while flowing in the formation by the acoustics, electric, thermal, neutron or gamma-ray logging.

Analysis of the changes in the size distribution function of the tracer agents will provide: information about pore size distribution, effective permeability of different pore ensembles, distribution of the fluid/fluid component saturation/rock chemical properties if chemically active markers are used, distribution of the rock wettability over the pore ensembles, temperature of the formation. This set of the properties is crucial for formation characterization, proper near wellbore treatment planning, proper Enhanced Oil Recovery (EOR) planning. Capability of estimation of this set of properties is principal improvement if compared with existing methods that are not capable to provide such information about sub terrain formation. If mixture of the active and non active tracers is used this allows to distinguish mechanical entrapment of the markers and influence of the other chemical and physical mechanisms.

The fluid with nano-markers is monitored from the wellbore by wireline or slickline tools or permanently mounted on the production tubing. Selection of the tools depends on the required depth of the investigation and properties of the nano-markers used. For example:
  short range 1-10 cm: NMR—markers from material with high contrast of NMR signal in respect of NMR for formation/injection fluid, gamma/neutron logs—marker from materials with high absorption/scattering coefficient;
  mid range 10-100 cm: resistivity logs—conductive materials or transport fluid;
  long range 1-20 m: acoustics—high density contrast between particles and transport fluid.
  very long range>10 m: bore-hole seismic tools for high seismic wave propagation contrast between the injected fluid and the reservoir fluid.

As an example the operation of the downhole conditions, the open hole formation testing tool, such as the Modular Dynamic Testing tool (MDT) is used, where the injection of the nano-tracer containing fluid is performed via the tool ports, within an isolated section of the formation, and afterwards the samples of the produced fluid are taken from the production port and analyzed with down hole fluid analysis (DFA) equipment. Results of the analysis are:
  Estimation of concentration of injected fluid in produced fluid;
  Marker size distribution in produced fluid—Colorimetry, light scattering/absorption (UV range).

Formation properties are calculated from the solution of the inverse problem: measured makers size distribution function is fitted to distribution function calculated using mesoscale simulations (see for example O. Yu. Dinariev, D. N.

Mikhailov "Modeling of isothermal processes in porous materials on the basis of the pore ensemble concept" Izvestia RAN Mechanics of Liquid and Gas 2007. No. 5. pp. 118-1323) of markers transport near wellbore. Evaluated properties are: distribution functions for pore size distribution, effective permeability of different pore ensembles, distribution of the fluid/fluid component saturation/rock chemical properties if chemically active markers are used, distribution of the rock wettability over the pore ensembles, temperature of the formation) calculation. If mixture of the active and non active markers is used this allows to distinguish mechanical entrapment of the markers and influence of the other chemical and physical mechanisms.

While the invention has been described with respect to a preferred embodiments, those skilled in the art will devise other embodiments of this invention which do not depart from the scope of the invention as disclosed therein. Accordingly the scope of the invention should be limited only by the attached claims.

The invention claimed is:

1. A method for estimating properties of a subterranean formation penetrated by a wellbore comprising the steps of:
   introducing an injection fluid into the well and the subterranean formation, the injection fluid comprising a plurality of tracer agents, wherein each tracer agent is an object of submicron scale,
   flowing fluid back from the subterranean formation and
   determining the properties of the formation by analyzing changes in the tracer agents concentration, size and type distribution function between the injection and produced fluids.

2. The method of claim 1 wherein analyzing changes in the tracer agents concentration, size and type distribution function between the injection and produced fluids is performed while flowing in the formation by the acoustics, electric, thermal, neutron or gamma-ray logging.

3. The method of claim 1 wherein analyzing changes in the tracer agents concentration, size and type distribution function between the injection and produced fluids is performed by comparing samples of the injection and produced fluids.

4. The method of claim 1 wherein the properties of the subterranean formation include pore size distribution, effective pore ensembles permeability, distribution of the fluid saturation, distribution of the fluid/rock chemical properties, rock wettability distribution over the pore ensembles, temperature of the formation.

5. The method of claim 1 wherein the plurality of tracer agents are low or insoluble gas bubbles having a diameter not more than 500 nm, the injection fluid is water- or hydrocarbon-based solution and the injection fluid with the plurality of tracer agents is a highly dispersed gas-liquid mixture.

6. The method of claim 5 wherein suitable gas for use as the tracer agent is selected from the group consisting of methane, higher molecular weight hydrocarbon gas, nitrogen or other insoluble inorganic gas or mixtures of thereof.

7. The method of claim 5 wherein the water-based solution additionally comprises electrolytes of ferrous ions, manganese ions, calcium ions, or any other mineral ion such that the electrical conductivity in the solution is not less than 300 $\mu$S/cm.

8. The method of claim 1 wherein the plurality of tracer agents are high viscous liquid droplets having a diameter not more than 1000 nm, the injection fluid is water- or hydrocarbon-based solution and the injection fluid with the plurality of tracer agents is an emulsion.

9. The method of claim 8 wherein the high viscous liquid is crude oil or toluene.

10. The method of claim 1 wherein the plurality of tracer agents are solid particles and the injection fluid with the plurality of tracer agents is a stabilized solution in aqueous fluids, solvent based fluids such as alcohols or hydrocarbon based fluids.

11. The method of claim 10 wherein the solid particles are selected from the group consisting of silica, synthesized copper, magnetite ($Fe_3O_4$), ferri/ferrous chlorides, barium iron oxide ($BaFe_{12}O_{19}$), zinc oxide, aluminium oxide, magnesium oxide, zirconium oxide, titanium oxide, cobalt (II) and nickel (II) oxide, barium sulfate ($BaSO_4$), pyrolectric and piezoelectric crystals etc.

12. The method of claim 1 wherein the tracer agents are chemically active.

13. The method of claim 1 wherein the injection fluid comprising a plurality of tracers is provided by mixing the injection fluid with the plurality of tracers by means of a generator placed in the wellbore.

14. The method of claim 1 wherein the injection fluid comprising a plurality of tracers is provided by mixing the injection fluid with the plurality of tracers by means of the surface located equipment.

15. The method of claim 1 wherein the injection fluid comprising a plurality of tracers is injected periodically during the treatment duration.

16. The method of claim 1 wherein the injection of the injection fluid is accompanied by a physical treatment performed before, during or after the injection process.

17. The method of claim 16 wherein the physical treatment is vibration, or heating, or acoustic treatments.

18. The method of claim 1 wherein the injection fluid additionally comprises one or more additives selected from a group comprising gelling agents, foaming agents, friction reducers, surfactants.

* * * * *